No. 622,105. Patented Mar. 28, 1899.
A. M. BERNARD, H. F. REYNAUD & W. J. BERNARD.
COMBINED STUBBLE SHAVER AND PLANT CANE SCRAPER.
(Application filed June 6, 1898.)
(No Model.) 2 Sheets—Sheet 1.
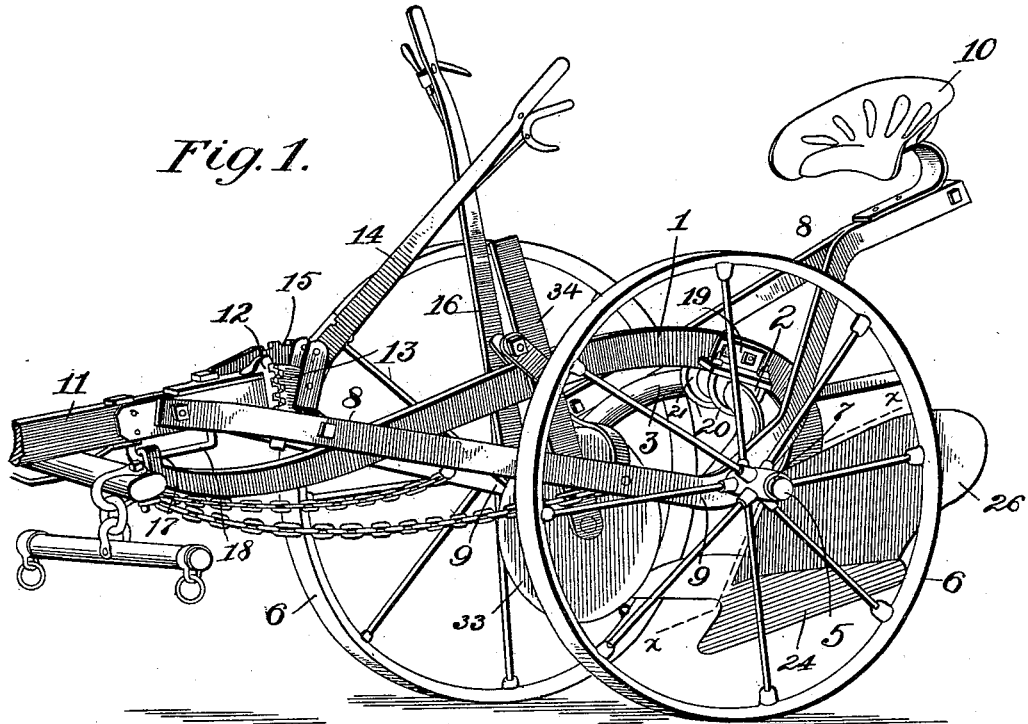
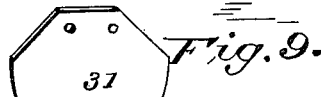
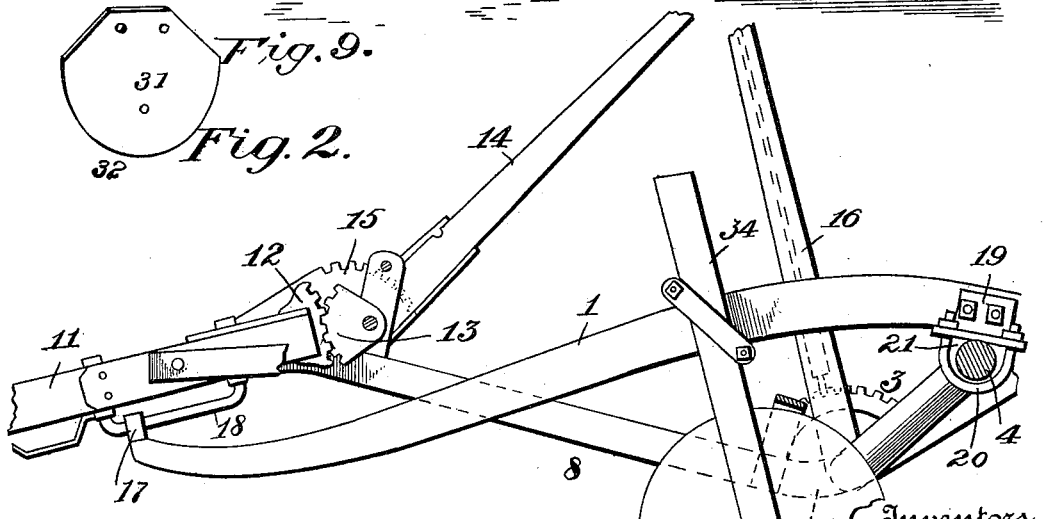

No. 622,105. Patented Mar. 28, 1899.
A. M. BERNARD, H. F. REYNAUD & W. J. BERNARD.
COMBINED STUBBLE SHAVER AND PLANT CANE SCRAPER.
(Application filed June 6, 1898.)
(No Model.) 2 Sheets—Sheet 2.

Inventors
A. M. Bernard
H. F. Reynaud
W. J. Bernard

Witnesses

By Attorneys

United States Patent Office.

ARTHUR MARTAN BERNARD, HECTOR FRENCIES REYNAUD, AND WILLY JOHN BERNARD, OF NEW IBERIA, LOUISIANA.

COMBINED STUBBLE-SHAVER AND PLANT-CANE SCRAPER.

SPECIFICATION forming part of Letters Patent No. 622,105, dated March 28, 1899.

Application filed June 6, 1898. Serial No. 682,760. (No model.)

*To all whom it may concern:*

Be it known that we, ARTHUR MARTAN BERNARD, HECTOR FRENCIES REYNAUD, and WILLY JOHN BERNARD, citizens of the United States, residing at New Iberia, in the parish of Iberia and State of Louisiana, have invented certain new and useful Improvements in a Combined Stubble-Shaver and Plant-Cane Scraper; and we do hereby declare the following to be a full, clear, and exact description of the invention, such as will enable others skilled in the art to which it appertains to make and use the same.

This invention relates to a combined stubble-shaver and plant-cane scraper; and it consists, primarily, of an adjustable beam having a horizontal cutter on the rear portion thereof, with an adjustable moldboard resting thereon, and front separator, all connected to an adjustable wheeled crank-axle and a supporting-frame having a tongue attached thereto.

The invention further consists of the details of construction and arrangement of the several parts, which will be hereinafter more fully described and claimed.

The object of the invention is to provide a machine which will operate to effectually cut stubble or other analogous standing growth remainder, scrape and shave ratoon-cane, &c., and separate growths generally, as well as throw up the soil adjacent and around the same.

Figure 3:
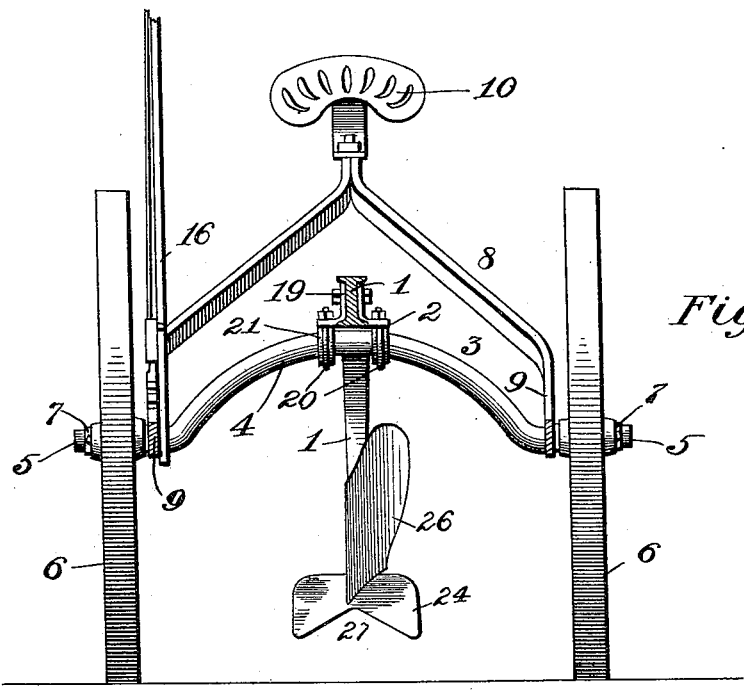
Figure 7:
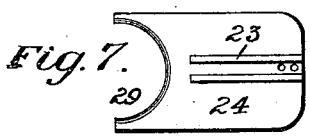
Figure 4:
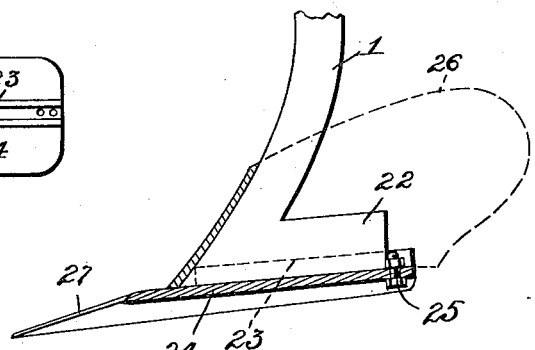
Figure 6:
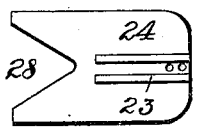
Figure 8:
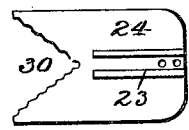
Figure 5:
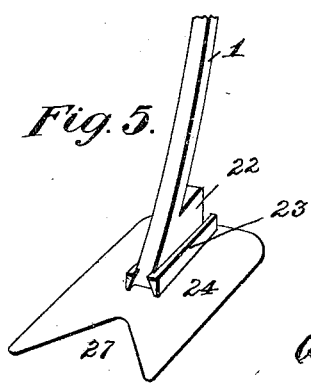

In the accompanying drawings, Figure 1 is a perspective view of a machine embodying the invention. Fig. 2 is a longitudinal vertical section of the same. Fig. 3 is a transverse vertical section. Fig. 4 is a section on the line *x x*, Fig. 1. Fig. 5 is a detail perspective view of a cutter attached to the beam. Figs. 6, 7, and 8 are detail views of modified forms of the cutter shown by Fig. 5. Fig. 9 is a detail view of a plant-cane scraper for use on the machine.

Referring to the drawings, wherein similar numerals are employed to indicate corresponding parts in the several views, the numeral 1 designates a main beam which is curved downwardly at the rear end, and connected thereto by cradles 2 is a crank-axle 3, having an intermediate arch 4 and opposite straight outwardly-projecting ends 5, which form bearings for ground-wheels 6. These ground-wheels are of any preferred form of construction and movable on their bearings to increase or decrease the span thereof through the medium of the collars 7, having set-screws therein, said collars being adjustable on said bearings. The frame 8, composed of opposite braces having central drops 9 and opposite converged united ends, is connected to said crank-axle, the points of attachment therewith being the lowest parts of the drops. In view of the drop arrangement of said frame the opposite converged ends are elevated above the main intermediate portion thereof, and to the rear end a suitable driver's seat 10 is secured, and the opposite parts of the front end pivotally embrace the rear of a tongue 11. On the extreme rear end of said tongue a segmental gear 12 is secured, and meshing therewith is a lower toothed head 13 of a shifting lever 14, pivotally mounted in the front adjacent portion of the frame 8 and provided with a dog to engage a toothed retaining-segment 15 at one side, as in ordinary constructions of this character. The crank-axle 3 is also adjusted vertically by means of a lever 16, connected thereto and having well-known devices to sustain the degree of adjustment. When the said crank-axle is raised or lowered, the beam 1 is moved therewith and the tongue 11 also adjusted to regulate the draft relatively to the position of said beam. The front end of the beam has an upper apertured lug extension 17, which loosely engages a traveler-rod 18 on the under side of the rear part of the tongue, and thereby said beam is free to assume a forward or rearward position commensurate with the adjustment of the crank-axle. The cradles 2 consist of plates 19, secured to opposite sides of the rear part of the beam 1 and projecting laterally therefrom in a horizontal plane. In the outer free end of each of said plates 19 the opposite ends of a U-clip 20 are secured, said clip surrounding the collar 21 on the said crank-axle and permits movement of the latter without bearing directly on said axle.

On the rear end of the beam 1 a foot 22 is attached or formed and has beveled sides to removably engage a dovetailed shoe 23 on the upper rear portion of a horizontal cutter 24. The shoe 23 is preferably bolted to the said cutter, and after the foot 22 is fitted therein the parts are held against separation by a rear bolt 25. This bolt can be easily removed and another cutter attached to the beam or another device, which will be presently set forth. Also secured to the said beam, adjacent the foot 22, is a double moldboard 26, which incloses the foot and shoe and extends rearwardly a suitable distance, the cutter 24 standing in advance of the said moldboard. The said cutter consists of a flat metallic plate having a V-shaped recess 27 in the front thereof, with the walls ground down to cutting edges, and while this is a very efficient form for general purposes modifications may be resorted to, as shown by Figs. 6, 7, and 8. Fig. 6 shows the cutter having a V-shaped recess 28 of less extent than that shown in the main figure and wherein the outer terminations of the opposite walls lie within the adjacent terminations of the front part of said cutter. The difference between this form of the cutter and that shown applied is that the V-shaped recess is of less depth or general dimensions. In Fig. 7 the cutter is shown formed with a semicircular recess 29, and in Fig. 8 a corrugated recess 30 is illustrated. This change in form might be indefinitely continued, and it will be understood that the variations will be made to suit different kinds of work. In the manufacture of the machine a number of these cutters will be made and furnished therewith, and one may be substituted for another at any time found necessary and desirable.

To adapt the machine for scraping plant-cane, the cutter 24 is removed from the lower rear end of the beam 1, and the cutter 31 (shown in detail by Fig. 9) is substituted therefor. This cutter 31 has a circular cutting edge 32, which will effectively carry on the desired operation as the entire machine moves forwardly.

In advance of the cutter 24 is a circular rotating cutter 33, which is supported by a standard 34, held on the beam 1. The purpose of the said circular cutter is to divide the stubble and surplus earth or soil, so that it will stand equally on opposite sides of the row. This latter cutter is situated directly in front of the moldboard 26 and facilitates the operation of the cutter 24. It can be adjusted vertically, as it is simply clamped on the beam 1.

The frame 8 is adapted to be braced at points found necessary to strengthen the same, and draft-chains, as shown, may extend therefrom to the draft devices. Instead of the cutter 24 a double plow-point or fluke can be attached to the beam and continued from the moldboard 26, and thereby adapt the machine for general cultivating purposes.

Other changes in the dimensions and minor details of construction might be resorted to without sacrificing the advantages of the invention or departing from the spirit of the same.

Having thus described the invention, what is claimed as new is—

1. In a machine of the character set forth, the combination of a frame having front and rear converging ends and intermediate drops, a beam mounted in said frame, a wheeled crank-axle attached to said beam, a horizontally-disposed cutter on the lower portion of said beam, a double moldboard above the cutter and attached to said beam, and means for adjusting the several parts.

2. In a machine of the character set forth, the combination of a frame having opposite side drops and front and rear converging ends, a tongue having its rear end pivotally mounted between the front ends of said frame and provided with a rear toothed segment, a traveler-rod on the lower portion of the tongue adjacent its pivotal point, a main beam having a cutter and moldboard on the rear portion thereof and an apertured lower extension at the front end engaging the said traveler-rod, a wheeled crank-axle connected to said beam, and means for adjusting the crank-axle and the tongue and frame.

3. In a machine of the character set forth, the combination of a frame having opposite side drops and front and rear converging ends, a tongue adjustably secured to the front of said frame, a traveler-rod on the tongue, a main beam having a moldboard and a cutter on the rear portion thereof and an apertured lug at the front end engaging the said traveler-rod, plates connected to the rear part of the said beam having U-clips removably mounted therein, a wheeled crank-axle having a collar engaged by the said clips, and means for adjusting the several parts.

4. In a machine of the character set forth, the combination of a main beam having a cutter and moldboard on the rear portion thereof, a wheeled crank-axle connected to said beam, a frame having opposite side drops and front and rear converging ends, a tongue adjustably secured to the front of the said frame and to which the front of the beam is also movably connected, and means for adjusting the several parts.

In testimony whereof we affix our signatures in presence of two witnesses.

ARTHUR MARTAN BERNARD.
HECTOR FRENCIES REYNAUD.
WILLY JOHN BERNARD.

Witnesses:
WILLIAM CASTANIE,
CHAS. JONES.